United States Patent
Dore (10) Patent No.: US 9,363,125 B2
(45) Date of Patent: Jun. 7, 2016

(54) BLIND PHASE TRACKING METHOD FOR A FILTER BANK MULTI-CARRIER (FBMC)RECEIVER

(71) Applicant: COMMISSARIAT A L'ENERGIE ATOMIQUE ET AUX ENERGIES ALTERNATIVES, Paris (FR)

(72) Inventor: Jean-Baptiste Dore, Saint Martin le Vinoux (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/790,708

(22) Filed: Jul. 2, 2015

(65) Prior Publication Data

US 2016/0006592 A1 Jan. 7, 2016

(30) Foreign Application Priority Data

Jul. 4, 2014 (FR) ..................................... 14 56434

(51) Int. Cl.
*H04B 1/10* (2006.01)
*H04L 27/26* (2006.01)
*H04L 27/22* (2006.01)

(52) U.S. Cl.
CPC ............ *H04L 27/264* (2013.01); *H04B 1/1027* (2013.01); *H04L 27/22* (2013.01); *H04L 27/266* (2013.01); *H04L 27/2649* (2013.01); *H04L 27/2679* (2013.01); *H04L 27/2684* (2013.01); *H04L 27/2688* (2013.01)

(58) Field of Classification Search
CPC ... H04L 27/264; H04L 27/22; H04L 27/2649; H04L 7/0016; H04L 7/02; H04L 27/2688; H04L 27/2684; H04B 1/1027
See application file for complete search history.

(56) References Cited

U.S. PATENT DOCUMENTS

| 2004/0052305 | A1* | 3/2004 | Olson ................... H04B 1/7105 375/148 |
| 2004/0135928 | A1* | 7/2004 | Kim ....................... H04L 27/066 348/726 |
| 2007/0127355 | A1* | 6/2007 | Li .......................... H04B 1/7103 370/201 |
| 2015/0009906 | A1  | 1/2015 | Dore et al. |
| 2015/0063507 | A1  | 3/2015 | Dore et al. |
| 2015/0124749 | A1  | 5/2015 | Mawlawi et al. |
| 2015/0146770 | A1  | 5/2015 | Dore et al. |

OTHER PUBLICATIONS

French Preliminary Search Report issued Mar. 20, 2015 in French Application 14 56434, filed on Jul. 4, 2014 (with English Translation of Categories of Cited Documents).

(Continued)

*Primary Examiner* — Jean B Corrielus
(74) *Attorney, Agent, or Firm* — Oblon, McClelland, Maier & Neustadt, L.L.P.

(57) ABSTRACT

A blind phase tracking method for an FBMC receiver. The frequency components of the received signal, after translation into baseband and filtered by an analysis filter bank, is processed by a phase estimation module. The latter estimates for each subcarrier the data carried and, where appropriate, the interference generated by the other data. A simplified symbol is then constructed with the sign of the data thus estimated and, where appropriate, the sign of the interference thus estimated. The phase estimation module determines the phase from the frequency components and simplified symbols. The phase correction is performed by multiplication by a phase correction factor.

7 Claims, 8 Drawing Sheets

(56) References Cited

OTHER PUBLICATIONS

Peiman Amini, et al., "Packet Format Design and Decision Directed Tracking Methods for Filter Bank Multicarrier Systems", EURASIP Journal on Advances in Signal Processing, 2010, 25 pages.

Behrouz Farhang-Boroujeny, "OFDM Versus Fitter Bank Multicarrier", (Development of broadband communication systems), IEEE Signal Processing Magazine, (92), 2011, 21 pages.

Botaro Hirosaki, "An Orthogonally Multiplexed QAM System Using the Discrete Fourier Transform" IEEE Transactions on Communications, vol. Com-29 (7), 1981, 8 pages.

Pierre Siohan, et al., "Analysis and Design of OFDM/OQAM Systems Based on Filterbank Theory", IEEE Transactions on Signal Processing, vol. 50, (5), 2002, 14 pages.

M. Bellanger, et al., "FBMC physical layer: a primer" www.ict-phydyas.org 2010, 31 pages.

Michael Speth, et al., "Optimum Receiver Design for OFDM-Based Broadband Transmission-Part II: A Case Study", IEEE Transactions on Communications, vol. 49, (4), 2001, 8 pages.

U.S. Appl. No. 14/771,394, filed Aug. 28, 2015, Dore, et al.

\* cited by examiner

BLIND PHASE TRACKING METHOD FOR A FILTER BANK MULTI-CARRIER (FBMC) RECEIVER

TECHNICAL FIELD

The present invention relates generally to the field of telecommunication systems using a multi-carrier modulation filter bank, still called FBMC systems (Filter Bank Multi-Carrier). The present invention relates more particularly to a blind phase tracking method in an FBMC receiver.

PRIOR ART

Telecommunication systems using multi-carrier modulation are well known in the prior art. The principle of such modulation is to divide the transmission band into a plurality of frequency sub-channels associated with subcarriers and modulate each of these sub-carriers by the data to be transmitted.

The most common multi-carrier modulation is undoubtedly OFDM modulation (Orthogonal Frequency Division Multiplexing). This is implemented in WLAN and WiFi wireless local area networks, WiMAX wireless broadband internet access, DVB-T, ISDB-T and DAB digital broadcasting systems, xDSL asymmetric digital links, LTE fourth generation cellular telephony, etc.

In an OFDM transmission system, each block of OFDM symbols is preceded by a guard interval or a cyclic prefix of a length greater than the temporal spread of the channel impulse response in order to eliminate intersymbol interference. The insertion of a guard interval or a cyclic prefix, however, leads to a loss of spectral efficiency. Finally, as the spectral occupancy of an OFDM signal is significantly greater than the band of sub-carriers that it uses, due to the spread of the sidelobes, OFDM modulation is not an optimal solution for applications requiring high rates of out-of-band rejection.

Modulation by a bank of synthesis filters or an FBMC (Filter Bank Multi Carrier) may be used as an alternative to OFDM modulation.

A comparison between FBMC systems and OFDM systems has been presented in the article by B. Farhang-Bouroujeny entitled "OFDM versus filter bank multicarrier" published in IEEE Signal Processing Magazine, pp. 91-112, March 2011.

The principle of FBMC modulation is based on synthesis by a filter bank at the transmission, and a filter bank analysis at the reception.

Figure 1:
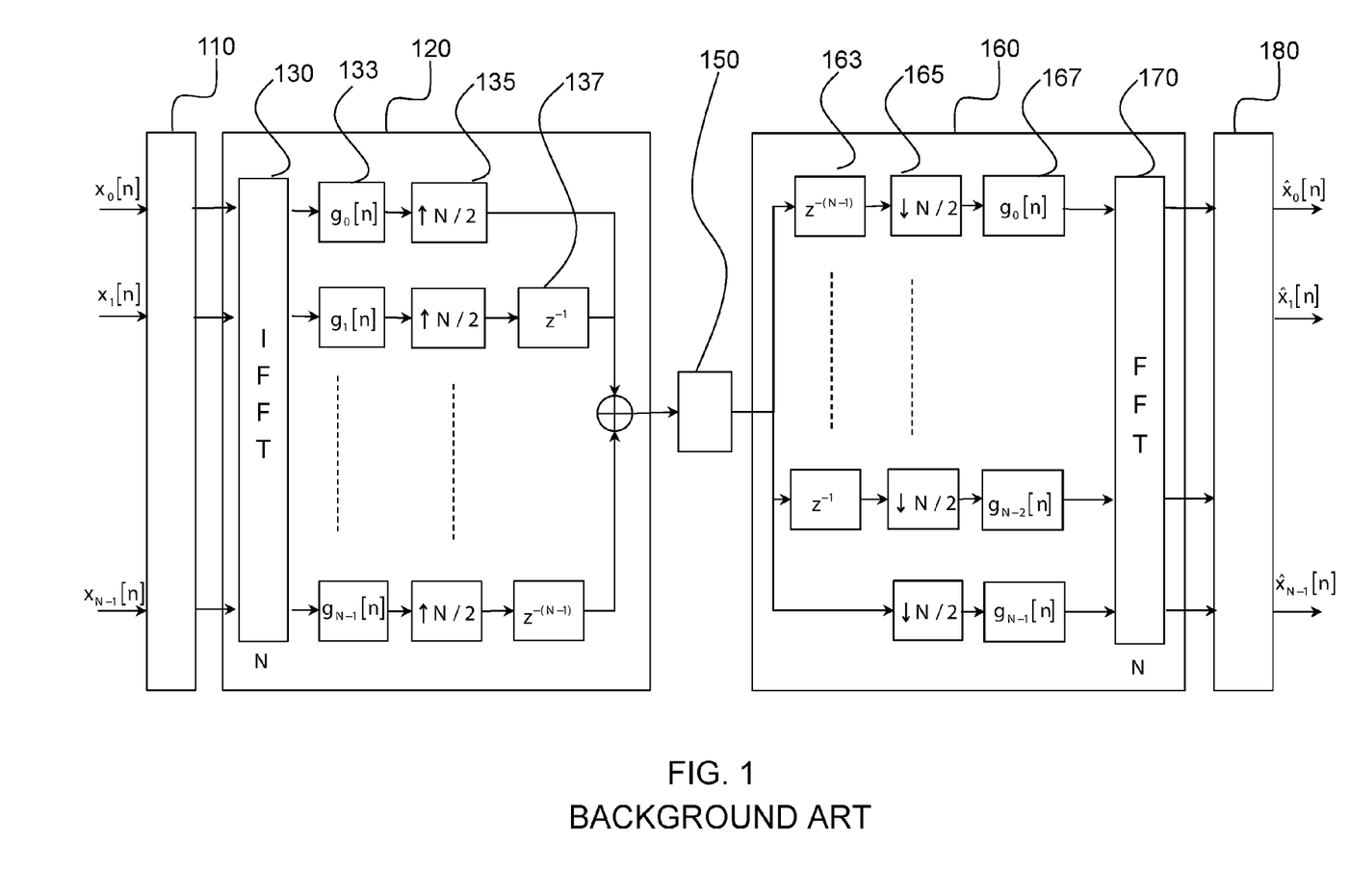
FIG. 1 shows an FBMC telecommunication system known from the prior art.

FIG. 1 schematically shows the structure of a first FBMC transmission/reception system known from the prior art.

This structure has been described in detail in the article by B. Hirosaki entitled "An orthogonally multiplexed QAM system using the discrete Fourier transform" published in IEEE Trans on Comm., Vol. 29, No. 7, pp. 982-989, July 1981, and in the article by P. Siohan et al. entitled "Analysis and design of OFDM/OQAM systems based on filter bank theory" published in IEEE Trans. on signal processing, vol. 50, No. 5, pp. 1170-1183, May 2002.

At the transmitter, the QAM modulation symbols to be transmitted at a rate Nf or f=1/T are grouped by blocks of size N, $x_0[m], \ldots, x_{N-1}[m]$, where m is the time index of the block. Each block of N symbols is provided in parallel to N input channels of a preprocessing module 110, so-called OQAM preprocessing (Offset QAM). This preprocessing module performs a OQAM type of data modulation, i.e. temporal demultiplexing of the real and the imaginary part of $x_k[m]$ at a rate of 2f.

The samples thus obtained are supplied in the form of blocks of a size N to a synthesis filter bank 120, consisting of an IFFT module (inverse fast Fourier transform) of size N, 130, of a plurality N of polyphase filters 133, of a plurality of over-samplers 135, of factor M=N/2, output from various polyphase filters, and finally a plurality of delays 137, arranged in parallel and varying from 0 to N−1 sampling periods. Each of the N processing channels corresponds to a subchannel.

The outputs of the polyphase filters, oversampled and delayed, are summed by the adder 139 before translation to an RF frequency (not shown) and transmitted over the channel 150.

Polyphase filters are translated versions at a frequency of k/MT of a prototype filter whose impulse response is the time LT, in other words, the output of a polyphase filter temporally overlaps the output of the adjacent polyphase filter of M samples. The result is that a polyphase filter output temporally overlaps L other outputs of polyphase filters. For this reason, the coefficient L is known as the overlapping factor.

On the receiver side, after demodulation in baseband, the received signal is sampled with a rate Nf. The samples are supplied as blocks of a size N to a bank of analysis filters, 160, comprising a plurality of delays 163, arranged in parallel and varying from 0 to N−1 sampling periods, in the reverse order of the delays 137. The flow of samples output from the various delays are then decimated by a factor M=N/2 by the decimators 165, and then filtered by the analysis filter bank 167. The analysis filters have an impulse response temporally conjugated and inverted with respect to the corresponding synthesis filter. Since the prototype filter is real-valued and symmetrical due to temporal inversion, one can show that the analysis filter has the same impulse response as the corresponding synthesis filter. The combination of a synthesis filter with the corresponding analysis filter (product of the transfer functions) gives a Nyquist filter.

The symbols at the output of the synthesis filters are then subjected to an FFT (Fast Fourier Transform) of size N in 170, whereby the various frequency components of the FFT are then provided to the post-processing module 180 that performs processing inverse to that of the preprocessing 110.

As the synthesis/analysis filtering is performed in the temporal domain, respectively at the output of the IFFT module and at the input of the FFT module, the FBMC system shown in FIG. 1 is said to be implemented in the said temporal domain.

The FBMC system is also capable of implementation in the frequency domain as described in M. Bellanger et al. entitled "FBMC physical layer: a primer", available at the "ict-phydyas" organization web site. In this case, the synthesis filtering is performed in the frequency domain upstream of the IFFT module while, similarly, the analysis filtering is performed in the frequency domain upstream of the FFT module.

Whatever the type of implementation, one of the main problems to be solved is to estimate and correct the phase terms that may affect the symbols possibly affecting the various subcarriers (at the output of the FFT module for temporal implementation and at the output of the analysis filters for frequency implementation). These phase terms may come from various origins.

First of all, they may be due to imperfect synchronisation between the transmitter and the receiver, more precisely between the transmitter oscillator providing the RF band translation and the receiver oscillator providing the inverse translation of the received signal in the baseband. By imperfect synchronisation is meant here a frequency difference or CFO (Carrier Frequency Offset). Even when one allows for estimation and correction of the frequency at the receiver level, this correction is generally inadequate due to a bias of the estimator and the possible presence of a phase residue.

Then, these phase terms may be due to a phase and/or frequency drift of the receiver oscillator. This drift of the phase/frequency may, in particular, be due to ageing, to temperature variations, or to an intrinsic instability of the oscillators. In this case, it is not possible to synchronise the oscillators and one must perform a phase compensation at the reception.

Finally, these phase terms may be caused by variations in the characteristics of the propagation channel (e.g. Doppler shift). In fact, if the channel estimation does not allow for a sufficiently rapid equalisation, some uncompensated phase terms may appear at the receiver.

Various phase tracking techniques are known in the prior art. One distinguishes schematically the supervised techniques, the blind techniques and the hybrid techniques. Supervised techniques use pilot symbols distributed in a predetermined manner within the flow of symbols to be transmitted. Measurement of the phase may be performed reliably and periodically through these pilot symbols. However, the techniques known as blind assume no prior knowledge of the transmitted symbols but rely on either the statistical properties of the signal or a first rough estimate of the received symbols (decision directed estimation). Finally, hybrid techniques successively implement supervised estimates and blind estimates. For example, when data are transmitted as packets with a preamble and a payload, they are known to incorporate the pilot symbols in the preamble to allow a supervised estimate of the beginning of the packet. This estimate may then continue in a blind manner upon receipt of the payload.

The supervised estimation techniques have been widely explored in the context of OFDM. Examples can be found in particular in the article by M. Speth et al. entitled "Optimum receiver design for OFDM-based broadband transmission—Part II": a case study" published in IEEE Trans. on Comm., Vol. 49, No. 4, April 2011, pages 571-578.

However, these estimation techniques are not easily transposable to FBMC receivers due to the specificity of OQAM modulation. In fact, even assuming that the FBMC receiver is perfectly synchronised with the transmitter and the absence of noise, a complex symbol obtained at the output of the FFT module at the moment m and on the subcarrier k may be expressed in the form:

$$s_k(m) = x_k(m) + j\epsilon_k(m) \quad (1)$$

when the symbol $x_k(m)$ is transmitted on the real part, and:

$$s_k(n) = \epsilon_k(n) + jx_k(n) \quad (2)$$

where $\epsilon_k(n)$ is an interference term depending on the data on the adjacent subcarriers and the adjacent moments, as well as the response of the prototype filter.

If one takes the case of data transmitted on the real part and assumes that the received symbol is affected by a phase term, this may be expressed in the form:

$$r_k(m) = (x_k(m) + j\epsilon_k(m))\exp(j\phi(m)) + n_k(m) \quad (3)$$

where $x_k(m)$ is the real symbol carried by the subcarrier k, $n_k(m)$ is a noise sample on the carrier k at the moment m, and $\phi(m)$ is the phase term at that moment.

A blind phase tracking method for an FBMC receiver has been proposed in the article of P. Amini et al. entitled "Packet format design and decision directed tracking methods for filter bank multicarrier systems" published in EURASIP Journal on Advances in Signal Processing, 2010. This method uses partial information of each symbol when estimating the phase term through:

$$\hat{\phi}(m) = \arg\left(\sum_{k=0}^{K-1} r_k(m)\hat{x}_k(m)\right) \quad (4)$$

where $\hat{x}_k(m)$ is the symbol (real) estimated by the receiver at the moment m and the subcarrier k. In other words:

$$\hat{\phi}(m) = \arg\left(\sum_{k=0}^{K-1} |x_k(m)|^2 \exp(j\phi) + jI_k(m,\phi) + N_k(m)\right) \quad (5)$$

with $I_k(m,\phi) = \epsilon_k(m)x_k(m)\exp(j\phi)$ and $N_k(m) = x_k(m)n_k(m)$. If the number of terms under the sum sign is sufficiently large (large number of carriers), the sum of the terms $I_k(m,\phi)$ tends to be cancelled on average, and the estimator offers good performance. However, In practice, the interference term $I_k(n,\phi)$ may be locally very large before $|x_k(n)|^2$, which leads to erroneous phase estimates and a high symbol error rate.

The object of the present invention is to provide a method for blind or hybrid phase tracking in a FBMC receiver, which does not present the drawbacks of the prior art, in particular that allows a substantial reduction in the symbol error rate, while being particularly simple and robust.

PRESENTATION OF THE INVENTION

The present invention is defined by a method of blind phase tracking for an FBMC receiver, whereby the received signal is demodulated into baseband, filtered by an analysis filter bank and subjected to an FFT, in order to provide a plurality of frequency components, whereby each frequency component corresponds to a subcarrier, and whereby, in the said method, one:
- estimates the data transmitted on each subcarrier from the frequency components;
- determines the sign of the data thus estimated;
- constructs a simplified symbol for each subcarrier from the signs thus determined, whereby the real part or the imaginary part of the simplified symbol is encoded on a single bit;
- estimates a phase difference between the frequency components and the said simplified symbols;
- applies a phase correction to the signal received from the phase difference thus estimated.

Advantageously, one:
- estimates from the data thus estimated, the interference affecting each of the subcarriers;
- determines the sign of each interference thus estimated;
- constructs the simplified symbol for each subcarrier from the sign of the estimated data for this subcarrier and the sign of the estimated interference for this subcarrier, whereby the real part and the imaginary part of each simplified symbol is encoded on a single bit.

The estimation of the data of the subcarriers and/or of the interference affecting each of the subcarriers may be carried out based on previously regenerated frequency components, whereby the regenerated frequency components are obtained from the frequency components by means of processing that comprises OQAM demodulation and channel decoding followed by a new OQAM modulation.

The frequency components may be equalised before the estimation of the data and/or interference on each of the subcarriers.

The said phase difference may be advantageously estimated by averaging over all the subcarriers of the Hermitian products of the frequency components with simplified symbols.

The thus estimated phase difference may be filtered using a low pass filter, whereby a mean phase correction factor is obtained from the phase shift thus filtered, and the mean phase correction factor is applied to the received signal, after translation into baseband.

Alternatively, the phase difference thus estimated may be filtered using a low pass filter, whereby a mean phase correction factor is derived from the phase shift thus filtered, and whereby the mean phase correction factor is applied to the said frequency components.

When the received signal is provided in the form of packets and each packet comprises a preamble and a payload, the said phase shift may be first estimated in a first step from pilot symbols belonging to the preamble, and then, in a second step, by means of the said blind phase tracking from the signal during the payload.

BRIEF DESCRIPTION OF DRAWINGS

Other characteristics and advantages of the invention will appear on reading the preferred embodiments of the invention, with reference to the accompanying drawings, which include.

DETAILED DESCRIPTION OF SPECIFIC EMBODIMENTS

In what follows, we consider an FBMC receiver as described in the introduction, whereby this receiver may be implemented in the temporal domain or in the frequency domain in a known manner. In the following, we will assume, in the absence of specific remarks, that the FBMC receiver is implemented in the temporal domain. However, a person skilled in the art will appreciate that the phase tracking method is applicable regardless of the type of implementation.

The idea underlying the invention is to perform a phase estimation using estimated symbols in a simplified manner, whereby the real and imaginary parts are expressed on a single bit.

Figure 2:
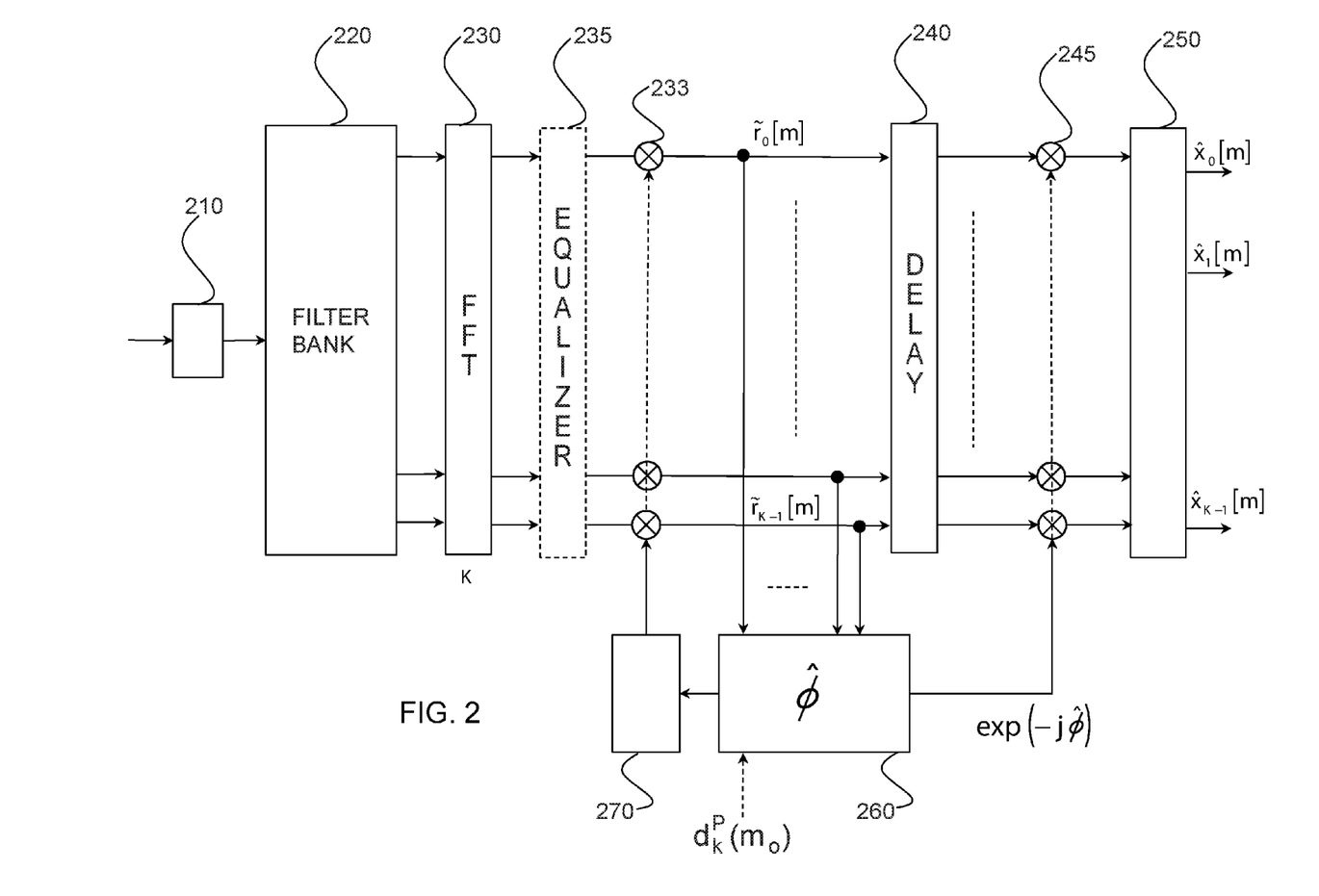
FIG. 2 shows an FBMC receiver using a phase tracking method according to a general embodiment of the invention.

More specifically, FIG. 2 shows an FBMC receiver implementing a phase tracking method according to a general embodiment of the invention.

The FBMC receiver has an overall structure similar to that described in relation to FIG. 1. More specifically, it comprises a baseband translation module 210, a bank of analysis filters, 220, followed by an FFT module. The frequency components output from the FFT module are equalised in the frequency domain by means of an equaliser 235 in a known manner. In the case of an implementation of an FBMC receiver in the frequency domain, the analysis filtering and equalisation are performed after the FFT module. Of course, if the transmission channel is purely additive, equalisation is not necessary. The frequency components, equalised as necessary, are considered after filtering by the analysis and FFT filters, whereby the order of operations depends on the type of implementation.

These frequency components are then delayed in an FIFO buffer 240 before being each multiplied by a phase correction factor in the multipliers 245 and undergoing an OQAM demodulation in the unit 250. This demodulation is followed by channel decoding (not shown).

The FBMC receiver further comprises a phase estimator module 260, using simplified symbols, as detailed below. This estimator performs an estimate of the phase difference between the frequency components and these simplified symbols. The phase difference thus estimated $\hat{\phi}$, is used to calculate a phase correction factor $\exp(-j\hat{\phi})$. The phase correction factor is multiplied with each of the frequency components, delayed by the FIFO buffer 240. The delay corresponds to the processing time in the estimator. Advantageously, for reasons of timing, the delay is made equal to the period of calculation of the FFT and the phase estimation is carried out in the same time.

The phase correction by the multipliers 245 is performed at each FFT block, i.e. at each FBMC symbol. This "instant" phase correction is advantageously complemented by an "average" phase correction. To do this, the estimated phase differences $\hat{\phi}$ or phase correction factors $\exp(-\hat{\phi})$ are averaged by means of a recursive low-pass filter (IIR filter) in order to provide an average corrective factor. The time constant of the low pass filter may be chosen to be of the order of the duration of a packet. The average correction factor is then applied at the output of the FFT module (before or after the equaliser 235, when the latter is present) over all the frequency components through the multipliers 233. Alternatively, the average correction factor may be applied at the output of the translation to baseband module 210.

In addition to the blind phase estimation, the module 260 may periodically carry out a phase estimate from pilot symbols, e.g. pilot symbols in the preamble of the packets. This variant has been shown in FIG. 2 by taking into account optional pilot symbols $d_k^P(m_0)$ in the estimation module 260. In this case, the phase tracking is then hybrid in that it comprises supervised phase compensation at the beginning of each packet (or plurality of packets), in a blind manner between two consecutive supervised estimates.

The phase estimation module 260 may be implemented according to various embodiments described below.

Figure 3A:
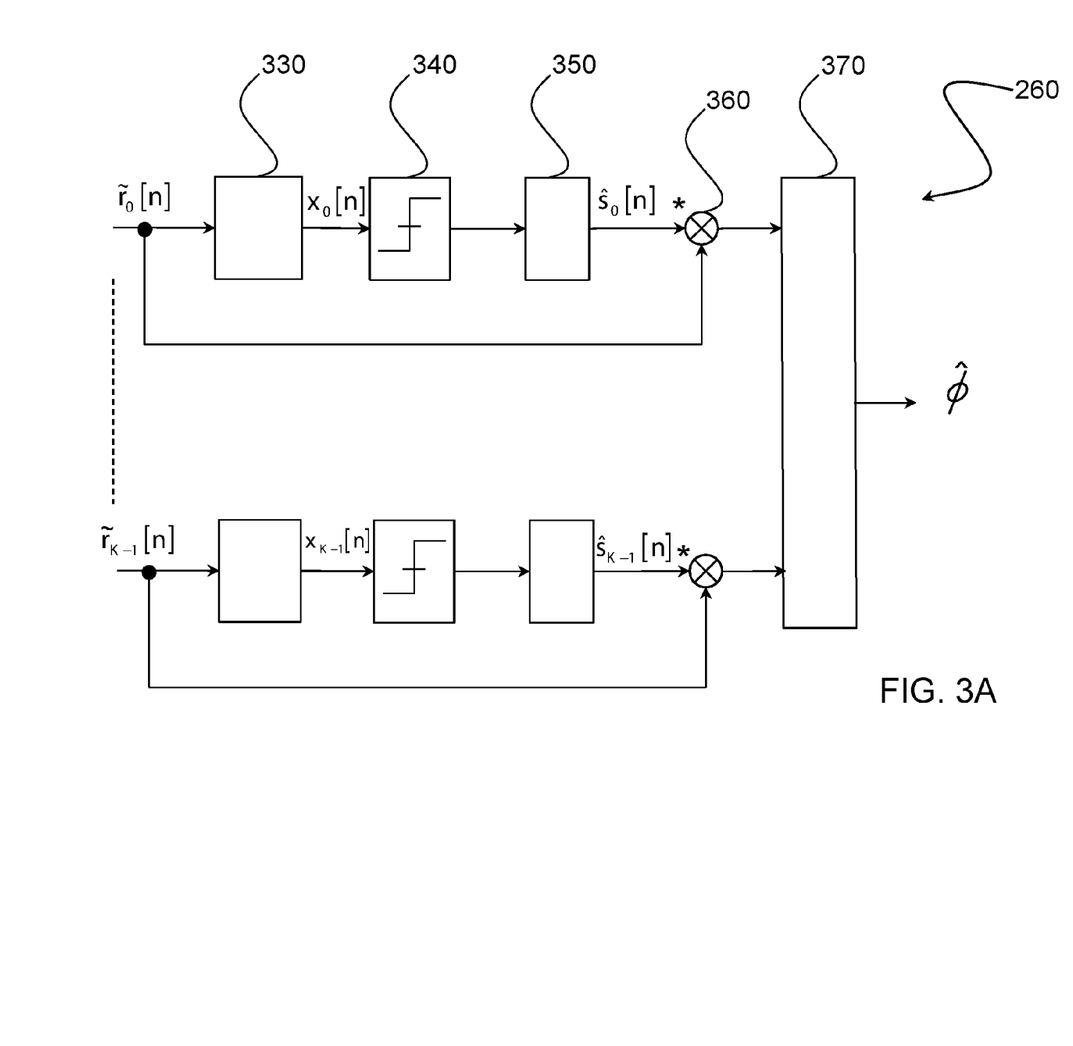
FIG. 3A shows a phase estimation module for implementing phase tracking according to a first embodiment of the invention.

FIG. 3A shows a phase estimation module according to a first embodiment.

The latter receives the frequency components of the received signal, after demodulation in baseband, filtering by the analysis filter bank and, if necessary, equalisation. These frequency components are noted $\tilde{r}_k[m]$, $k=0, \ldots, K-1$, where k is a subcarrier index. The module 330 determines, for each of these components, the data transmitted on the subcarrier. More specifically, if the sub-carrier carries a QAM symbol real value (e.g. subcarrier even index), data is estimated as the real part $\hat{d}_k(m)=\Re(\tilde{r}_k[m])$ of the component, whereas if the subcarrier carries a QAM symbol imaginary value (e.g. subcarrier odd index), the data will be estimated as the imaginary part of this component $\hat{d}_k(m)=\Im(\tilde{r}_k[m])$.

The data estimated by the module 330 is then coded on a bit. Specifically, the sign detector 340 detects the sign of the data thus estimated, either $sgn(\Re(\tilde{r}_k[m]))$ or $sgn(\Im(\tilde{r}_k[m]))$ and accordingly provides a bit (BPSK symbol), i.e. −1 if the sign is negative and +1 if the sign is positive.

The module 350 builds a simplified symbol, noted $\hat{s}_k[m]$ from the sign detected by the unit 340. Specifically:

if k is even, $\hat{s}_k[m]=sgn(\Re(\tilde{r}_k[m]))$ (6-1)

if k is odd, $\hat{s}_k[m]=jsgn(\Im(\tilde{r}_k[m]))$ (6-2)

The simplified symbol $\hat{s}_k[m]$ is nothing else than a simplified estimate, reduced to the sign, of the data carried by the subcarrier k. Therefore, the real part or the imaginary part of the simplified symbol is encoded on a single bit. The term "simplified symbol" reflects the fact that the QAM symbol (e.g. 64-QAM) is encoded on several bits while the simplified symbol is encoded on one bit (sign bit).

A multiplier 360 then effects the Hermitian product $\tilde{r}_k[m]\hat{s}_k^*[m]$ of the component of the subcarrier k, $\tilde{r}_k[m]$, together with the simplified symbol obtained for the same subcarrier $\hat{s}_k[m]$. The Hermitian products thus obtained for the various carriers are then supplied to a calculation module that determines the argument $\hat{\phi}$ of the sum of these products, i.e.:

$$\hat{\phi} = \arg\left(\sum_{k=0}^{K-1} \tilde{r}_k[m]\hat{s}_k^*[m]\right) \quad (7)$$

Figure 3B:
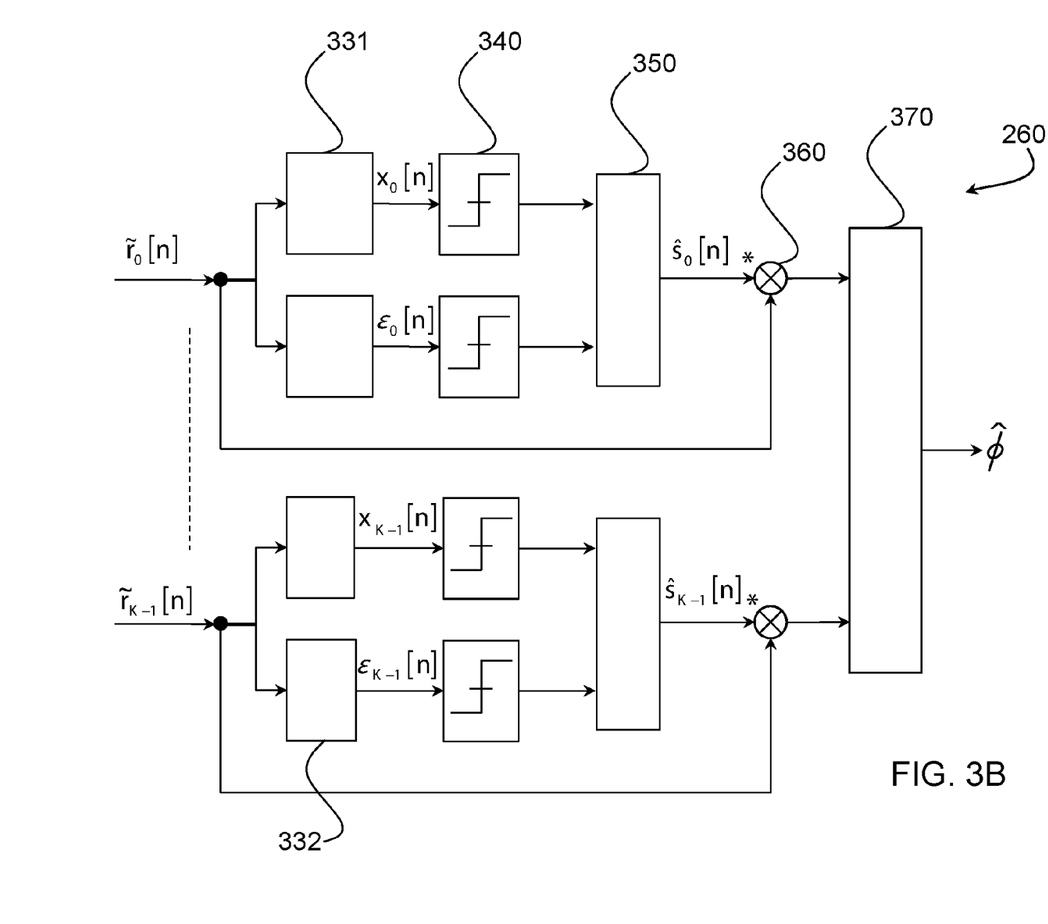
FIG. 3B shows a phase estimation module for implementing phase tracking according to a second embodiment.

FIG. 3B shows a phase estimation module according to a second embodiment.

As in the first embodiment, the phase estimation module receives the frequency components of the received signal, filtered by the analysis battery. If necessary, the frequency components, obtained at the FFT output are equalised as described above. Unlike in the case of the first embodiment, two simplified symbols are estimated per frequency component: a first simplified symbol corresponding to the data is carried by the subcarrier, and a second simplified symbol corresponding to the interference of this same subcarrier from the data on adjacent carriers and the previous/following moments. The table below gives an example of interference generated by data conventionally equal to 1, carried by the subcarrier k at the moment m. The impulse response of the prototype filter has a length here of L=2.

|     | m − 2  | m − 1   | m     | m + 1   | m + 2  |
|-----|--------|---------|-------|---------|--------|
| k − 1 | −0.125 | −0.206j | 0.239 | 0.206j  | −0.125 |
| k   | 0      | 0.564   | 1     | 0.564   | 0      |
| k + 1 | −0.125 | 0.206j  | 0.239 | −0.206j | −0.125 |

From a data value corresponding to a subcarrier and a moment (k,m), one can determine from the coefficients of the synthesis filter, the interference generated on the adjacent subcarrier (k−1,k+1) as well as for the preceding moments (m−2,m−1) and following (m+1,m+2).

The modules 331 first estimate data on the various subcarriers. This estimation is identical to that performed by the modules 330 in the first embodiment.

The modules 332 in turn estimate the interference generated on each subcarrier. For a given subcarrier, the interference is determined from data estimated for adjacent subcarriers and, if applicable, for the preceding moments.

At the moment m and for a subcarrier k, the estimated data is noted $\hat{d}_k(m)$ and the estimated interference is noted $\hat{i}_k(m)$. For each subcarrier k, the two sign detectors 340 determine the respective signs of $\hat{d}_k(m)$ and $\hat{i}_k(m)$.

For each subcarrier, the module 350 builds a simplified symbol, noted $\hat{s}_k[m]$, from the signs detected by the modules 340. Specifically:

if k is even, $\hat{s}_k[m]=sgn(\hat{d}_k(m))+jsgn(\hat{i}_k(m))$ (8-1)

if k is odd, $\hat{s}_k[m]=sgn(\hat{i}_k(m))+jsgn(\hat{d}_k(m))$ (8-2)

This shows that the real and the imaginary part of the simplified symbol are each encoded on a single bit.

A multiplier 360 then effects the Hermitian product $\tilde{r}_k[m]\hat{s}_k^*[m]$ of the component of the subcarrier k, $\tilde{r}_k[m]$, together with the simplified symbol obtained for the same subcarrier $\hat{s}_k[m]$. The Hermitian products obtained for the various carriers are then provided to a calculation module 370, which determines the argument $\hat{\phi}$ as above by:

$$\hat{\phi} = \arg\left(\sum_{k=0}^{K-1} \tilde{r}_k[m]\hat{s}_k^*[m]\right) \quad (9)$$

Figure 3C:
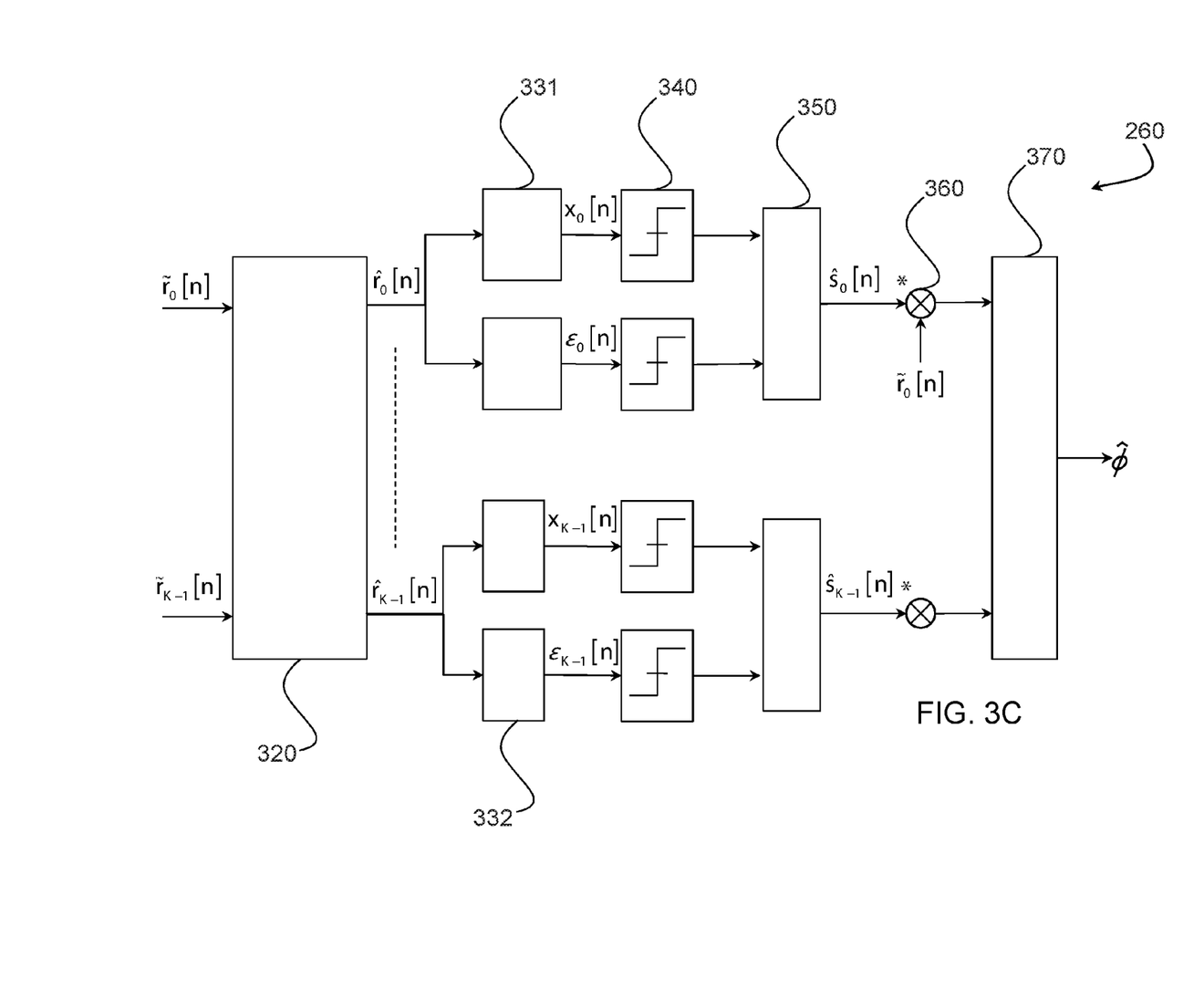
FIG. 3C shows a phase estimation module for implementing phase tracking according to a third embodiment.

FIG. 3C shows a phase estimation module according to a third embodiment.

This embodiment differs from the preceding embodiment by the presence of the regeneration module 320. This module includes an OQAM demodulator (identical to the OQAM demodulator 180 of FIG. 1), a channel decoder (implementing, for example, the Viterbi algorithm), followed by a channel coder and a OQAM modulator (identical to the OQAM modulator 110 of FIG. 1). At the output of unit 320, one thus obtains frequency components regenerated from data corrected by the channel decoding. The simplified symbols are constructed from these regenerated frequency components $\hat{r}_0[n], \ldots, \hat{r}_{K-1}[n]$ instead of the original frequency components $\tilde{r}_0[n], \ldots, \tilde{r}_{K-1}[n]$.

According to a fourth embodiment (not shown) of the phase estimation module, the regeneration module 320 may be alternatively provided upstream of the modules 330 of FIG. 3A. In this case, the data of the various subcarriers are estimated from regenerated frequency components $\hat{r}_0[n], \ldots, \hat{r}_{K-1}[n]$ instead of the original frequency components $\tilde{r}_0[n], \ldots, \tilde{r}_{K-1}[n]$, while the simplified symbols are constructed from the data thus estimated as explained in relation to FIG. 3A.

Figure 4:
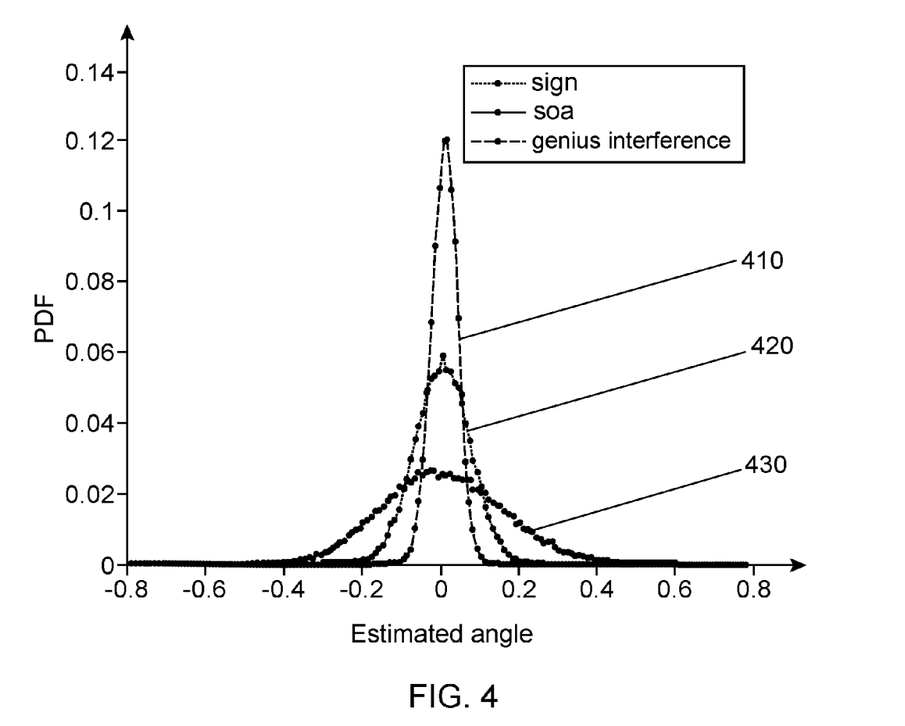
FIG. 4 shows the performance of the phase estimation module of FIG. 3B.

FIG. 4 shows the phase estimator performance used by the blind phase tracking module of FIG. 3B.

More precisely, this figure shows the probability density of the phase estimation error in radians of various estimators for a signal to noise ratio of 13 dB. The curve 410 gives the probability density of the phase estimation error for an ideal phase estimator, assuming perfect reconstruction of the interference (a so-called "genius" estimator estimating without error the interference term $I_k(n,\phi)$ of the equation (5)). The curve 430 represents the probability density of the estimation error for a phase estimator of the prior art, using a partial estimation of each symbol, as proposed in the P. Amini article cited above.

Finally, curve 420 shows the probability density of the phase estimation error for the estimator of FIG. 3B, i.e. using simplified symbols representing the signs of the data and the interference.

One notes that the phase estimator in FIG. 3B is substantially better than that of the prior art and with reduced complexity.

Figure 5A:
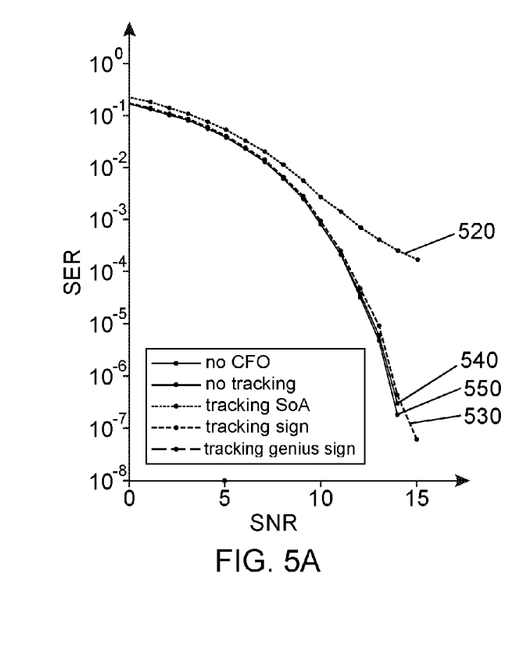
FIGS. 5A-5C show the performance of a phase tracking method according to an embodiment of the invention for different values of frequency offset between the transmitter and the FBMC receiver.
Figure 5B:
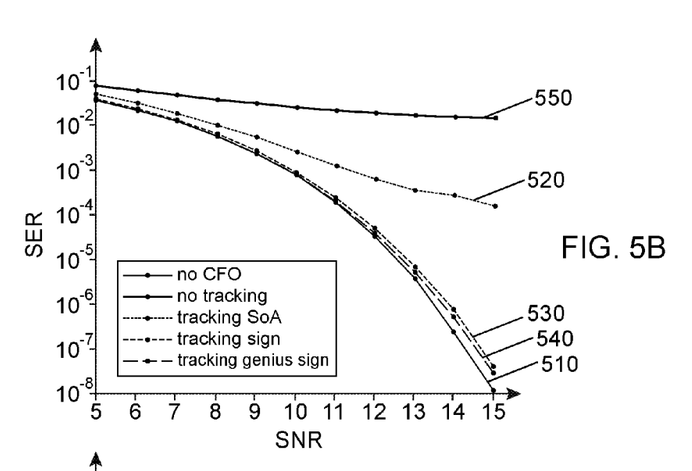
Figure 5C:
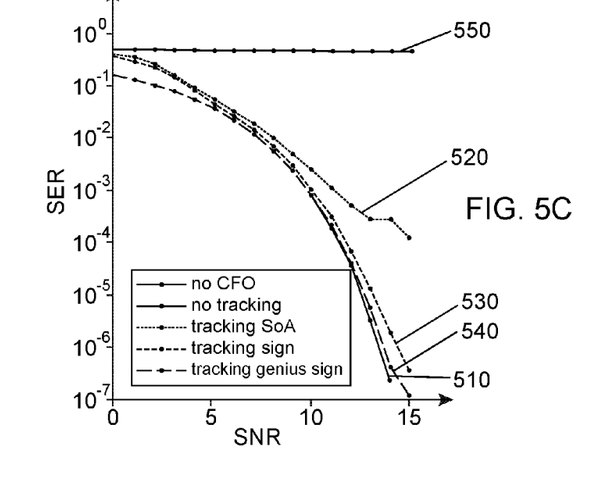

In FIGS. 5A-5C is shown the symbol error rate curves as a function of the signal to noise ratio for various methods of phase tracking in an FBMC receiver. The frequency offsets between the transmitter and receiver are respectively 0 Hz for FIG. 5A, 40 Hz for FIG. 5B and 200 Hz for FIG. 5C.

For the sake of comparison, the case was further shown in each figure where the receiver was perfectly synchronised with the transmitter (zero offset frequency, curve 510).

Conversely, there is shown in 550 the case where no phase tracking is performed.

The curve 520 corresponds to a phase tracking method according to the prior art based on a partial estimate of the symbols.

The curve 530 corresponds to phase tracking implementing the phase estimator of FIG. 3B.

Finally, curve 540 corresponds to ideal phase tracking for which it is assumed that the phase estimator is a "genius" (perfect knowledge of the interference term).

One notes that in all cases, the phase tracking method according to the invention leads to a lower symbol error rate than in the prior art, and all the more so in that the signal to noise ratio is degraded.

Figure 6A:
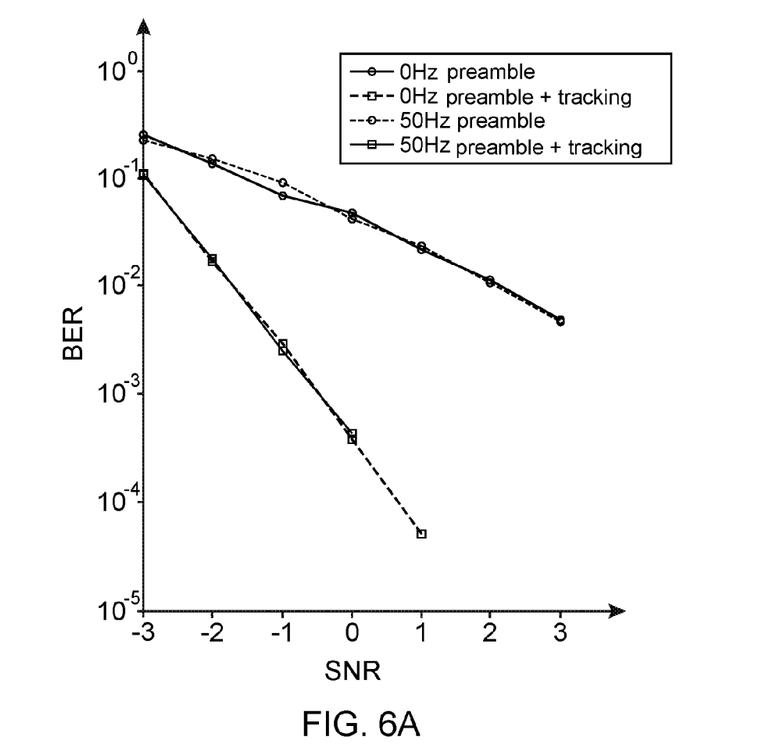
FIGS. 6A-6B show the performance of an FBMC receiver using a phase tracking method according to an embodiment of the invention.
Figure 6B:
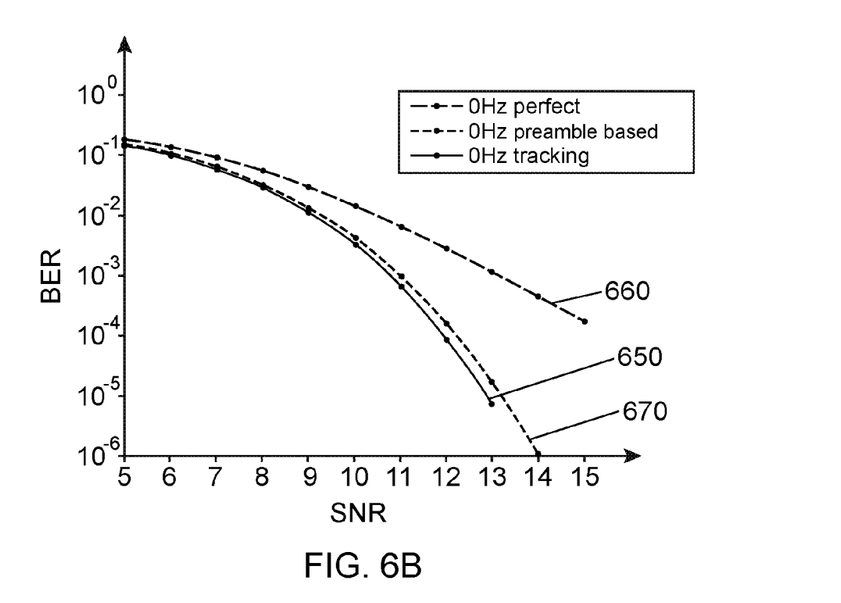

FIGS. 6A and 6B show the performance of an FBMC receiver using a phase tracking method according to an embodiment of the invention.

Performance here is relative to a complete receiving chain including synchronisation, channel estimation, phase tracking and channel decoding. They are therefore expressed in bit error rate as a function of the signal to noise ratio.

FIGS. 6A and 6B are respectively related to a QPSK modulation and a 64-QAM modulation. In other words the symbols carried by the subcarriers belonging to a QPSK modulation alphabet in the first case, and 64-QAM in the second case.

In FIG. 6A, the curve 610 corresponds to the case where there is no frequency offset between the transmitter and the receiver, and where the phase estimation is performed only on pilot symbols in the preamble. In other words, the phase estimation is supervised and no phase tracking is performed on the part of the packet relating to the payload.

The curve 620 corresponds to the same case as that of the curve 610, with the difference that one carries out phase tracking on the payload after estimating the phase term (in a supervised manner) on the preamble. In this sense, the curve 620 relates to a method of hybrid tracking as defined in the introductory part. Phase tracking on the payload part is carried out using the phase estimation module of FIG. 3B.

The curves 630 and 640 relate to the same phase tracking strategies as the curves 610 and 620, but for a 50 Hz frequency offset between the receiver and the transmitter.

One notes that the blind tracking of the payload part of the packet, according to the present invention, significantly reduces the error rate in comparison to a simple supervised method.

FIG. 6B shows the performance of a complete FBMC reception chain for 64-QAM modulation and a lack of offset frequency between the transmitter and receiver. The curve 650 relates to the ideal case where one has an accurate estimation of the interference (genius estimator), curve 660 shows a case where one caries out phase estimation only on the preamble (supervised phase estimation), without phase tracking on the part of the packet relating to the payload. Finally, curve 670 relates to the case where one estimates the phase on the preamble, but where one then effects a tracking phase on the payload part of the packet by means of phase estimation module of FIG. 3B.

One notes here again in FIG. 6B that the phase tracking method based on simplified symbols, as proposed in the present invention, provides performance very close to the ideal case with relatively low computational complexity.

The invention claimed is:

1. A blind phase tracking method for a Filter Bank Multi-Carrier (FMBC) receiver, whereby [a received signal is demodulated into baseband, filtered by an analysis filter bank and subjected to fast Fourier transform (FFT), in order to provide a plurality of frequency components, whereby each frequency component corresponds to a sub-carrier, the method comprising:
    estimating data transmitted on each subcarrier from said frequency components;
    determining the sign of the data thus estimated;
    estimating from the data thus estimated interference affecting each of the subcarriers;
    determining the sign of each interference thus estimated;
    constructing a simplified symbol for each subcarrier from the sign of the estimated data for this subcarrier and the sign of the estimated interference for this subcarrier, whereby the real and the imaginary part of the simplified symbol is each encoded in a single bit;
    estimating a phase difference between the frequency components and said simplified symbols;
    applying a phase correction to the frequency components from the phase difference thus estimated.

2. A phase tracking method according to claim 1, wherein the estimation of the data of the subcarriers and/or interference affecting each of the subcarriers is effected from previously regenerated frequency components, whereby the regenerated frequency components are obtained from frequency components by means of processing comprising offset quadrature amplitude modulation (OQAM) demodulation and channel decoding followed by a new OQAM modulation.

3. The phase tracking method according to claim 1, wherein the frequency components are subject to equalisation before the estimation of the data and/or interference on each of the subcarriers.

4. The phase tracking method according to claim 1, wherein said phase difference is estimated by averaging over all subcarriers of the Hermitian products of the frequency components with the simplified symbols.

5. The phase tracking method according to claim 4, wherein the phase difference thus estimated is filtered using a low pass filter, whereby a mean phase correction factor is obtained from the phase difference thus filtered, while the mean phase correction factor is applied to the received signal, after translation to baseband.

6. The phase tracking method according to claim 4, wherein the phase difference thus estimated is filtered using a low pass filter, whereby a mean phase correction factor is obtained from the phase difference thus filtered, while the mean phase correction factor is applied to said frequency components.

7. The phase tracking method according to claim 1, wherein the received signal is in the form of packets, whereby each packet comprises a preamble and a payload, and whereby said phase difference is estimated first in a first step from pilot symbols belonging to the preamble and then, in a second step, with said blind phase tracking from the signal during the payload.

* * * * *